(12) United States Patent
van Zwol

(10) Patent No.: US 9,317,602 B2
(45) Date of Patent: Apr. 19, 2016

(54) SYSTEM AND METHOD FOR IN-CONTEXT EXPLORATION OF SEARCH RESULTS

(75) Inventor: Roelof van Zwol, Badalona (ES)

(73) Assignee: Yahoo! Inc., Sunnyvale, CA (US)

( * ) Notice: Subject to any disclaimer, the term of this patent is extended or adjusted under 35 U.S.C. 154(b) by 563 days.

(21) Appl. No.: 12/332,618

(22) Filed: Dec. 11, 2008

(65) Prior Publication Data

US 2010/0153384 A1 Jun. 17, 2010

(51) Int. Cl.
*G06F 17/30* (2006.01)

(52) U.S. Cl.
CPC .... *G06F 17/30864* (2013.01); *G06F 17/30648* (2013.01); *G06F 17/3064* (2013.01); *G06F 17/3097* (2013.01); *G06F 17/30389* (2013.01); *G06F 17/30554* (2013.01); *G06F 17/30651* (2013.01)

(58) Field of Classification Search
CPC .......... G06F 17/30554; G06F 17/3064; G06F 17/30389; G06F 17/30657; G06F 17/3097
USPC ................................... 707/706, 722, 732, 728
See application file for complete search history.

(56) References Cited

U.S. PATENT DOCUMENTS

| | | | | |
|---|---|---|---|---|
| 6,006,225 | A * | 12/1999 | Bowman et al. | |
| 6,564,213 | B1 * | 5/2003 | Ortega et al. | |
| 7,849,080 | B2 * | 12/2010 | Chang et al. | 707/723 |
| 7,921,107 | B2 * | 4/2011 | Chang et al. | 707/723 |
| 2007/0050339 | A1 * | 3/2007 | Kasperski et al. | 707/3 |
| 2007/0061331 | A1 * | 3/2007 | Ramer | G06F 17/30867 707/999.01 |
| 2007/0266002 | A1 * | 11/2007 | Chowdhury | G06F 17/30648 707/999.002 |
| 2008/0109401 | A1 * | 5/2008 | Sareen et al. | 707/3 |
| 2008/0208825 | A1 * | 8/2008 | Curtis et al. | 707/3 |
| 2009/0063461 | A1 * | 3/2009 | Wang et al. | 707/5 |
| 2009/0240683 | A1 * | 9/2009 | Lazier et al. | 707/5 |
| 2009/0248510 | A1 * | 10/2009 | Ahluwalia | 705/14 |
| 2009/0327224 | A1 * | 12/2009 | White et al. | 707/3 |
| 2009/0327236 | A1 * | 12/2009 | Denney et al. | 707/3 |

* cited by examiner

*Primary Examiner* — Rehana Perveen
*Assistant Examiner* — Tiffany Thuy Bui
(74) *Attorney, Agent, or Firm* — Hickman Palermo Becker Bingham LLP; Edward A. Becker

(57) ABSTRACT

A method of providing in-context exploration of a query results web page, wherein the web page has at least one element and a plurality of query results, receives an indication of interest in the at least one element, and in response to the indication, emphasizes at least one query result relative to the plurality of query results.

18 Claims, 3 Drawing Sheets

SYSTEM AND METHOD FOR IN-CONTEXT EXPLORATION OF SEARCH RESULTS

BACKGROUND

1. Field of the Invention

Aspects of the present invention relate generally to providing an ability to refine a search without having to fully execute a separate or new search.

2. Description of Related Art

Currently, some search systems return suggestions together with the search results, and a user is given the option of choosing any of the search results or running one of the suggested searches. When the user chooses one of the suggested searches, a new search is performed and the results presented to the user, just as if the user manually entered the suggested search terms into the search engine. While this functionality can be helpful, it generally is not very efficient, as the user has to wait for the new search to complete before determining whether the refinement helped or hurt.

Thus, it is desirable to more densely interlink search suggestions with already-received search results.

SUMMARY

In light of the foregoing, it is a general object of the present invention to provide a system and method for providing instant feedback related to suggested searches and other web page elements.

BRIEF DESCRIPTION OF THE DRAWING FIGURES

DETAILED DESCRIPTION

Figure 1:
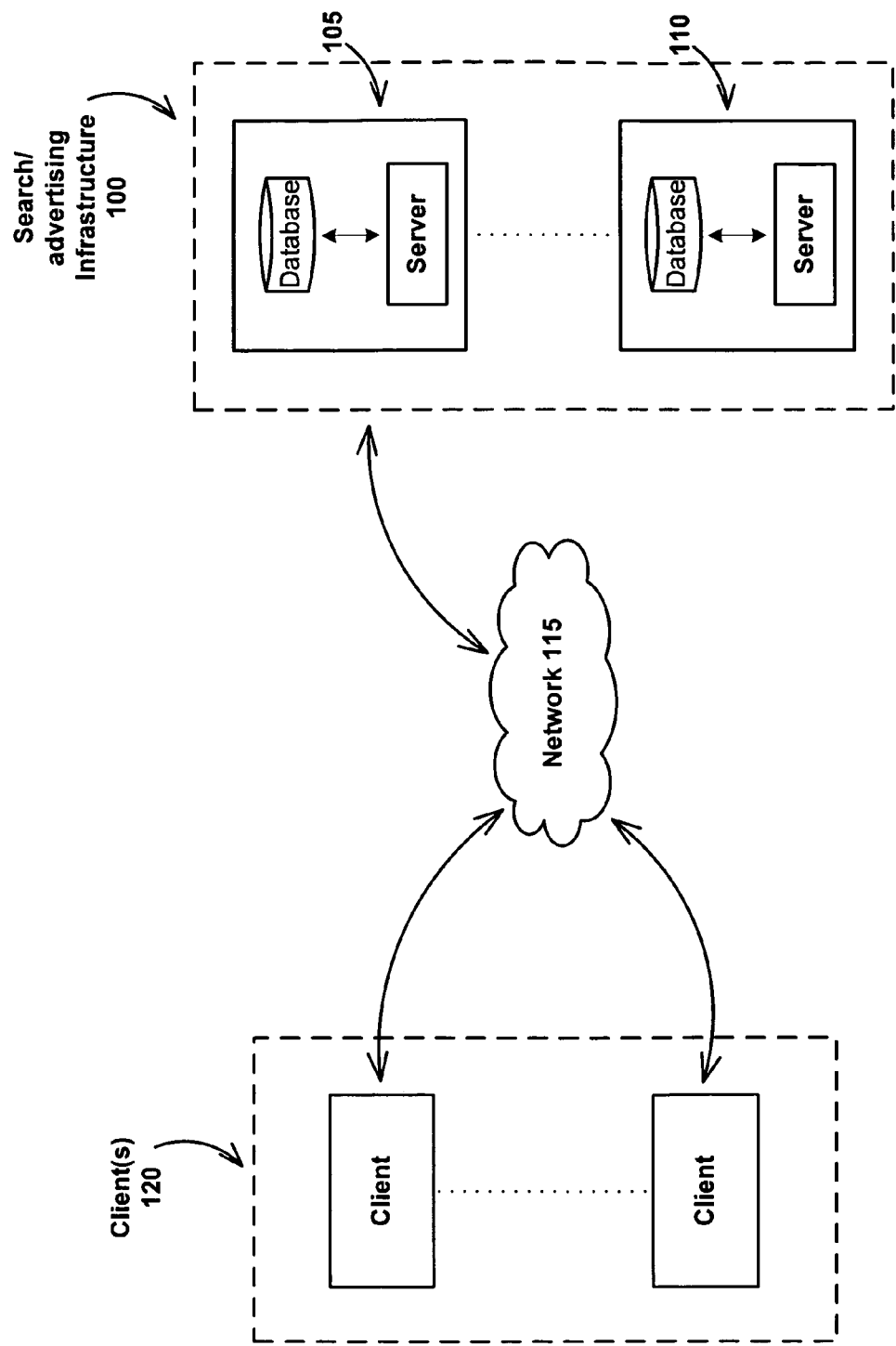
FIG. 1 is a functional block diagram of the general architecture of an exemplary embodiment of the present invention.

Detailed descriptions of one or more embodiments of the invention follow, examples of which may be graphically illustrated in the drawings. Each example and embodiment is provided by way of explanation of the invention, and is not meant as a limitation of the invention. For example, features described as part of one embodiment may be utilized with another embodiment to yield a further embodiment. It is intended that the present invention include these and other modifications and variations.

Aspects of the present invention are described below in the context of providing in-context feedback related to suggested searches received in response to a search query.

Throughout this disclosure, reference is made to "system," which is used to denote a search/advertising infrastructure through which an Internet search and/or advertising network operates (e.g., Yahoo!'s® Publisher Network, Yahoo! Search®, etc.). There currently are numerous search/advertising infrastructures (e.g., those run by Yahoo!®, Google™, etc.) and most offer similar services, such as, for example, responding to search queries from users, serving or presenting advertisements (which may be relevant to the search query), etc.; "serving" or "presenting," as used herein, is the mechanism by which advertisements are delivered to web pages.

FIG. 1 is a functional block diagram of the general architecture of an exemplary embodiment of the present invention. Search/advertising infrastructure 100, as described above, may include any of a number of servers 105 and 110 (which optionally may include databases), etc. required for its operation; search/advertising infrastructure 100 also may implement the methods used to provide in-context exploration of search results to an end user, as detailed herein. Client(s) 120 may comprise a user at a computer carrying out typical web actions (e.g., browsing, searching, etc.). Search/advertising infrastructure 100 and Client(s) 120 are linked together through Network 115 (e.g., the Internet, etc.).

Throughout this description, reference is made to "query," which is used to denote a search query given by a user when performing a search through a search engine. A query can comprise terms, and may contain a single term, multiple terms, a phrase of terms, etc. Generally, a query is related to a request for information.

Conventional search results may include both the search results that correspond directly with the search query, and suggested or recommended searches provided by a search assistant. For example, if a user searches for "cars," he may receive from a search engine search results that correspond directly with that search query, and from a search assistant various recommended searches, such as, for example, "cars to buy," "car history," etc. Generally, the recommended searches are hyperlinked to the Universal Resource Indicator (URI) of a corresponding search so that the user can explore the recommended search by clicking on the link (i.e., the click causes the search engine to run, and provide results for, the recommended search). It will be appreciated that how the search assistant determines its suggestions is not critical to the invention, and that this may done using any currently known methods, or methods that may be developed in the future.

Thus, current search assistants aim to help the user by refining their information request through suggestions, and providing related terms for the search query. If the user decides to try one of the suggested search queries, a new search corresponding to the suggested query is performed. This mechanism can be very powerful, especially when the user has a specific information need, but is maybe not quite an expert on the topic. At the same time however, the user's lack of expertise or knowledge on the topic limits his ability to know in advance the likely result of the suggested refinement (i.e., the result of running a suggested search, etc.), which may lead to a time-inefficient, trial-and-error undertaking. The main problem is that, at the level of the user interface, the search assistant and the set of search results are completely de-coupled.

By interlinking the search results with the search assistant, instant feedback related to the recommendations provided by the search assistant can be realized, and the user can more efficiently explore the recommendations and more quickly find the information he seeks. Generally, the instant feedback will relay to the user which of the current results corresponds to the context provided by the search assistant's suggestions; for the remainder of the detailed description, such results will be referred to as "in-context" results. Generally, the instant feedback may comprise any of a number of various ways of emphasizing the in-context results relative to the original results. For example, in-context results may be highlighted (e.g., by giving a yellow background to the associated text, etc.), non-in-context results may be faded, the size of the in-context results may be increased, etc.

Figure 2:
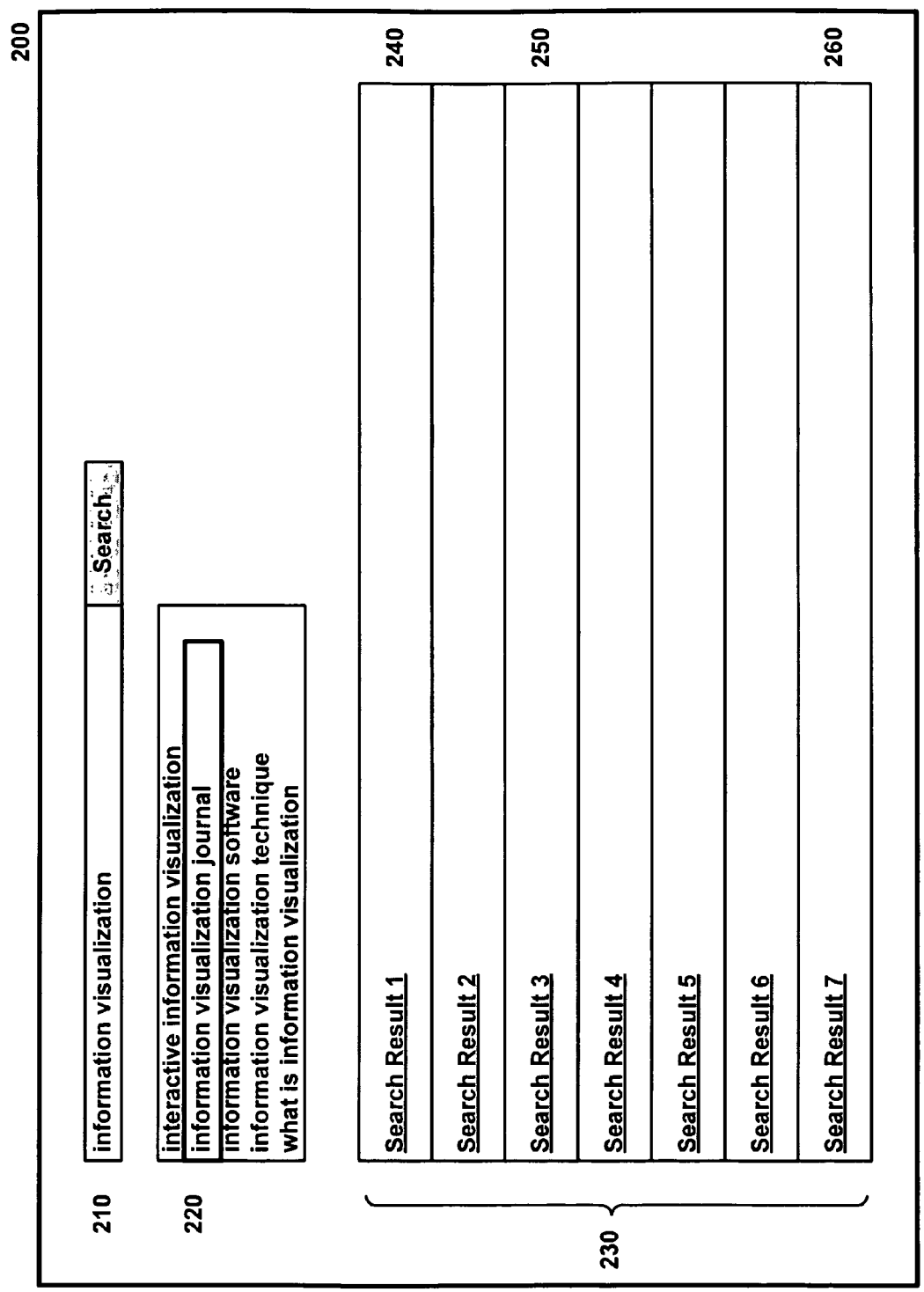
FIG. 2 is a search results web page illustrating operation of an exemplary embodiment of the present invention.

As an example of in-context results, consider search results page 200 illustrated in FIG. 2. Search box 210 contains a search query—"information visualization"—that a user has submitted to a search engine. Suggestions 220 are suggestions or recommendations provided by a search assistant, and presumably are related in some respect to the original search query.

Search results 230 may be the first few search results returned by the search engine. If the user mouses over the second suggestion—"information visualization journal"—in-context results 240, 250, and 260 may be highlighted or otherwise indicated in some manner as being related to the suggestion (i.e., those results, or types of results, may be returned by the search engine if the user clicks on the suggestion).

The correlations made between search results 230 and in-context results 240, 250, and 260 may be interacted with at the user-interface level by an in-context explorer, which can be implemented in any of a number of ways. For example, consider a JavaScript™ implementation whereby the JavaScript is generated server-side and incorporated into the search results web page shown to the user. The JavaScript™ may control the feedback given to the user when he mouses over (or performs some similar action on) a suggestion provided by the search assistant.

Figure 3:
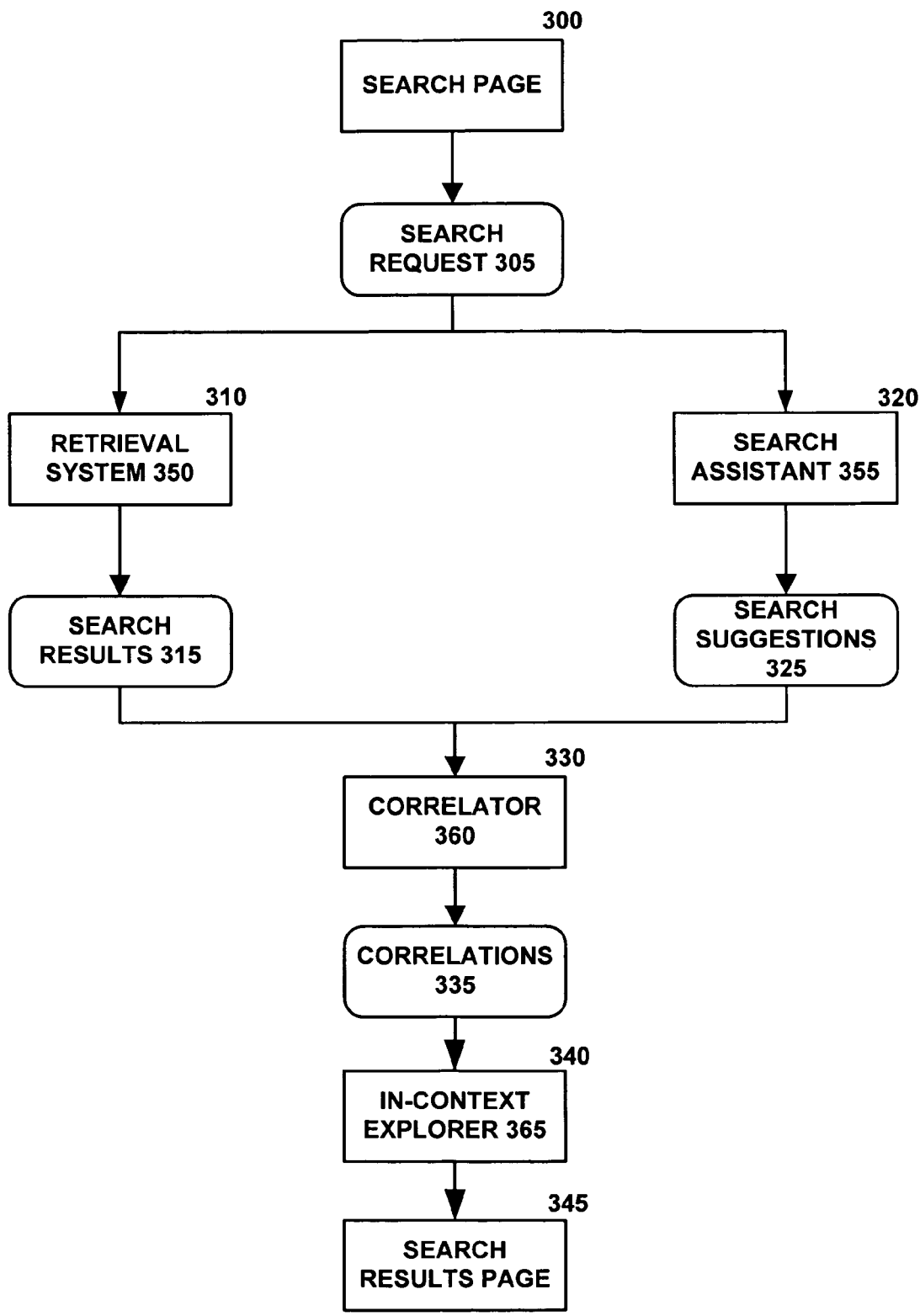
FIG. 3 illustrates generally a high-level architecture and process flow according to an embodiment of the present invention.

FIG. 3 illustrates generally a high-level architecture and process flow according to an embodiment of the present invention. At block 300 a user may arrive at a search page provided by, for example, search/advertising infrastructure 100, where the user may execute search request 305. Search request 305 is sent to both retrieval system 350 and search assistant 355, as shown at blocks 310 and 320, respectively. Though FIG. 3 shows blocks 310 and 320 occurring simultaneously, it will be appreciated that retrieval system 350 may, for example, receive the search request before search assistant 355, and that such order is not critical to the invention.

Retrieval system 350 may be a search/advertising infrastructure as described with regard to FIG. 1. Generally, retrieval system 310 will receive and respond to search request 305 with search results 315. Generally, search assistant 355 will receive and respond to search request 305 with search suggestions 325. At block 330, search results 305 and search suggestions 325 are received by correlator 360, which attempts to make correlations 335 between them (i.e., "in-context" results, as detailed herein). It will be appreciated that correlator 360 may be a part of, or entirely separate from, a search/advertising infrastructure, may be implemented in hardware or software, etc. In-context explorer 365 incorporates correlations 335 determined by correlator 360 into the search results page, such that correlations 335 may be explored by the recipient of the search results page, as shown at blocks 340 and 345. As discussed, in-context explorer 365 may be implemented in a variety of ways, including as JavaScript™ within the search results page.

It will be appreciated that the invention is not limited to search suggestions, but in fact may comprise any other "linkable" element presented on a search results page, including geographic maps, keywords, photographs, advertisements, etc. For example, consider a search executed on a photo-sharing service that hosts photos from users all over the world. The results of the search may be presented together with a map of the world, and points on the map may be correlated with the search results (by, for example, geographic information added to a photo by the camera that took it or by the user, etc.). In this scenario, an in-context explorer may emphasize photos returned by the search that correspond to a location on the map as indicated by the user (e.g., the user may hover his mouse over Florida, and if any of the photo search results corresponds to Florida, those results may be emphasized).

It also will be appreciated that the correlations made between the linkable elements (including search suggestions) and the in-context results may be accomplished in various ways, and that the methods used are not necessarily critical to the invention. For example, in the context of web search, a correlator may correlate search suggestions with search results by looking for similarities between the terms comprising a search suggestion and the content associated with each of the search results, including metadata incorporated into the source of the web page, or otherwise known by the search engine (e.g., the title of the web page linked to by a search result, the content of the web page linked to by a search result, etc.).

As another example, consider a social-bookmarking service where users of the service can add "keywords" (or "tags") or other descriptors to a bookmark; such keywords may be used by a correlator to correlate suggested keywords with search results, thus creating in-context results. For example, if a user searches for "exotic cars" on a social-bookmarking service, the service may return results that correspond to the search, and a search assistant (or similar) may determine and suggest keywords that may be relevant to the search (e.g., "car," "automobile," "horsepower," etc.), where the keywords already may be associated with one or more of the search results (e.g., a user who added one of the search results to the service also may have assigned to that result various keywords, etc.). When the user invokes the in-context explorer by, for example, mousing over a suggested keyword, the corresponding in-context result(s) may be emphasized.

As still another example, consider a photo-sharing service where a correlator may make correlations between photos based on keywords (e.g., those given by users of the system who upload/view the photos), geo-location information associated with a photo (e.g., as provided manually by a user, automatically by a camera, etc.), etc. Such correlations also may be made based on the content of the image; in this regard, it will be appreciated that a photo-sharing service may provide the ability to match images according to general shapes, colors, etc. For example, if a user searches for "big ben" through a photo-sharing service that provides content-based matching, he may be given a list of search results (in the form of, say, thumbnails) and samples with which to further filter the search results. After choosing one or more samples, in-context results may be determined (and emphasized) based on content-matching done between the chosen sample images and the search results.

In-context results need not be limited to just some subset of the original results, but also may comprise advertisements shown alongside the search results. In the case of a search/advertising infrastructure as detailed above—where the infrastructure may provide both the search results and advertisements that presumably are related to the search—the correlator may be able to determine which of the ads are relevant to the suggestions, and this determination may be based on any of various known methods. For example, when an advertiser initially purchases an ad to be shown alongside search results, he may provide with that purchase "keywords," or some other descriptor of the ad, and the keywords may be used to correlate the ad with a search suggestion (Oust as the keywords may now be used to inform the determination of whether the ad should be shown in response to a particular query). As another example, a correlation may be based on an analysis of the content of the page to which the ad points, etc.

The sequence and numbering of blocks depicted in FIG. 3 is not intended to imply an order of operations to the exclusion of other possibilities. Those of skill in the art will appreciate that the foregoing systems and methods are susceptible of various modifications and alterations. For example, while FIG. 3 concerns the specific example of correlating search results with search suggestions, other correlations may be made, including those discussed herein (e.g., correlating advertisements on the page with a search suggestion, etc.).

Those of skill in the art also will appreciate that the methods described herein may be performed on a computer which executes instructions stored on a computer-readable medium. The medium may comprise a variety of volatile and non-volatile storage devices, systems, or elements, including but not limited to solid-state memory, fixed media devices, and removable media which may be used in computers having removable media devices.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method comprising:
   generating a search results webpage for a search query, wherein the search results webpage includes both a plurality of search results for the search query and a plurality of suggested search queries related to the search query;
   detecting an indication of interest in a particular suggested search query from the plurality of suggested search queries; and
   in response to detecting the indication of interest in the particular suggested search query from the plurality of suggested search queries:
     determine, from the plurality of search results for the search query, a subset of search results that satisfy both the particular suggested search query and the search query, and
     concurrently with the display of the plurality of search results for the search query, visually emphasizing the subset of search results that satisfy both the particular suggested search query and the search query, wherein visually emphasizing the subset of search results that satisfy both the particular suggested search query and the search query is implemented by one or more of highlighting the subset of search results that satisfy both the particular suggested search query and the search query or de-emphasizing search results from the plurality of search results for the search query other than the subset of search results that satisfy both the particular suggested search query and the search query.

2. The method of claim 1, wherein concurrently with the display of the plurality of search results for the search query, visually emphasizing the subset of search results that satisfy both the particular suggested search query and the search query is implemented in JavaScript.

3. The method of claim 1, wherein the plurality of suggested search queries includes one or more of one or more query suggestions, one or more keywords, one or more photographs, one or more advertisements, and one or more geographic maps.

4. The method of claim 1, wherein the subset of search results from the plurality of search results for the search query that satisfy both the particular suggested search query and the search query satisfy the particular suggested search query based upon keywords associated with both the particular suggested search query and the subset of search results from the plurality of search results for the search query.

5. The method of claim 1, wherein the subset of search results from the plurality of search results for the search query that satisfy both the particular suggested search query and the search query satisfy the particular suggested search query based upon content associated with both the particular suggested search query and the subset of search results from the plurality of search results for the search query.

6. The method of claim 1, wherein visually emphasizing is applied to an advertisement on the search results webpage.

7. A non-transitory computer-readable medium storing instructions which, when processed by one or more processors cause:
   generating a search results webpage for a search query, wherein the search results webpage includes both a plurality of search results for the search query and a plurality of suggested search queries related to the search query;
   detecting an indication of interest in a particular suggested search query from the plurality of suggested search queries; and
   in response to detecting the indication of interest in the particular suggested search query from the plurality of suggested search queries:
     determine, from the plurality of search results for the search query, a subset of search results that satisfy both the particular suggested search query and the search query, and
     concurrently with the display of the plurality of search results for the search query, visually emphasizing the subset of search results that satisfy both the particular suggested search query and the search query, wherein visually emphasizing the subset of search results that satisfy both the particular suggested search query and the search query is implemented by one or more of highlighting the subset of search results that satisfy both the particular suggested search query and the search query or de-emphasizing search results from the plurality of search results for the search query other than the subset of search results that satisfy both the particular suggested search query and the search query.

8. The non-transitory computer-readable medium of claim 7, wherein concurrently with the display of the plurality of search results for the search query, visually emphasizing the subset of search results that satisfy both the particular suggested search query and the search query is implemented in JavaScript.

9. The non-transitory computer-readable medium of claim 7, wherein the plurality of suggested search queries includes one or more of one or more query suggestions, one or more keywords, one or more photographs, one or more advertisements, and one or more geographic maps.

10. The non-transitory computer-readable medium of claim 7, wherein the subset of search results from the plurality of search results for the search query that satisfy both the particular suggested search query and the search query satisfy the particular suggested search query based upon keywords associated with both the particular suggested search query and the subset of search results from the plurality of search results for the search query.

11. The non-transitory computer-readable medium of claim 7, wherein the subset of search results from the plurality of search results for the search query that satisfy both the particular suggested search query and the search query satisfy the particular suggested search query based upon content associated with both the particular suggested search query and the subset of search results from the plurality of search results for the search query.

12. The non-transitory computer-readable medium of claim 7, wherein visually emphasizing is applied to an advertisement on the search results webpage.

13. An apparatus comprising:
one or more processors; and
a memory storing instructions which, when processed by the one or more processors cause:
generating a search results webpage for a search query, wherein the search results webpage includes both a plurality of search results for the search query and a plurality of suggested search queries related to the search query; detecting an indication of interest in a particular suggested search query from the plurality of suggested search queries; and
in response to detecting the indication of interest in the particular suggested search query from the plurality of suggested search queries:
determine, from the plurality of search results for the search query, a subset of search results that satisfy both the particular suggested search query and the search query, and
concurrently with the display of the plurality of search results for the search query, visually emphasizing the subset of search results that satisfy both the particular suggested search query and the search query, wherein visually emphasizing the subset of search results that satisfy both the particular suggested search query and the search query is implemented by one or more of highlighting the subset of search results that satisfy both the particular suggested search query and the search query or de-emphasizing search results from the plurality of search results for the search query other than the subset of search results that satisfy both the particular suggested search query and the search query.

14. The apparatus of claim 13, wherein concurrently with the display of the plurality of search results for the search query, visually emphasizing the subset of search results that satisfy both the particular suggested search query and the search query is implemented in JavaScript.

15. The apparatus of claim 13, wherein the plurality of suggested search queries includes one or more of one or more query suggestions, one or more keywords, one or more photographs, one or more advertisements, and one or more geographic maps.

16. The apparatus of claim 13, wherein the subset of search results from the plurality of search results for the search query that satisfy both the particular suggested search query and the search query satisfy the particular suggested search query based upon keywords associated with both the particular suggested search query and the subset of search results from the plurality of search results for the search query.

17. The apparatus of claim 13, wherein the subset of search results from the plurality of search results for the search query that satisfy both the particular suggested search query and the search query satisfy the particular suggested search query based upon content associated with both the particular suggested search query and the subset of search results from the plurality of search results for the search query.

18. The apparatus of claim 13, wherein visually emphasizing is applied to an advertisement on the search results webpage.

* * * * *